United States Patent [19]

Dunn et al.

[11] Patent Number: 5,721,829
[45] Date of Patent: Feb. 24, 1998

[54] SYSTEM FOR AUTOMATIC PAUSE/RESUME OF CONTENT DELIVERED ON A CHANNEL IN RESPONSE TO SWITCHING TO AND FROM THAT CHANNEL AND RESUMING SO THAT A PORTION OF THE CONTENT IS REPEATED

[75] Inventors: Matthew W. Dunn, Seattle; Seung-Yup Chai; Joseph H. Matthews, III, both of Redmond, all of Wash.

[73] Assignee: Microsoft Corporation, Redmond, Wash.

[21] Appl. No.: 437,087

[22] Filed: May 5, 1995

[51] Int. Cl.⁶ .................. H04N 7/173; H04N 7/16
[52] U.S. Cl. .................. 395/200.49; 348/7; 379/88; 379/89
[58] Field of Search .................. 348/7, 12, 13; 379/89, 88, 203; 455/4.1, 4.2; 395/200.49, 200.01

[56] References Cited

U.S. PATENT DOCUMENTS

| | | | |
|---|---|---|---|
| 3,596,010 | 7/1971 | Patterson | 179/100.2 |
| 4,081,754 | 3/1978 | Jackson | 325/396 |
| 4,203,130 | 5/1980 | Doumit et al. | 358/1 |
| 4,228,543 | 10/1980 | Jackson | 455/181 |
| 4,498,194 | 2/1985 | Vandegraaf | 455/166 |
| 4,694,490 | 9/1987 | Harvey et al. | 380/20 |
| 4,704,725 | 11/1987 | Harvey et al. | 380/9 |
| 4,706,121 | 11/1987 | Young | 358/142 |
| 4,751,578 | 6/1988 | Reiter et al. | 358/183 |
| 4,908,713 | 3/1990 | Levine | 358/335 |
| 4,977,455 | 12/1990 | Young | 358/84 |
| 5,038,211 | 8/1991 | Hallenbeck | 358/142 |
| 5,068,734 | 11/1991 | Beery | 358/191.1 |
| 5,151,789 | 9/1992 | Young | 358/194.1 |
| 5,206,722 | 4/1993 | Kwan | 358/86 |
| 5,233,654 | 8/1993 | Harvey et al. | 380/20 |
| 5,307,173 | 4/1994 | Yuen et al. | 358/335 |
| 5,335,079 | 8/1994 | Yuen et al. | 358/335 |
| 5,335,277 | 8/1994 | Harvey et al. | 380/20 |
| 5,353,121 | 10/1994 | Young et al. | 348/563 |
| 5,357,276 | 10/1994 | Banker et al. | 348/7 |
| 5,477,263 | 12/1995 | O'Callaghan et al. | 348/7 |
| 5,479,266 | 12/1995 | Young et al. | 358/335 |
| 5,479,268 | 12/1995 | Young et al. | 358/335 |
| 5,506,615 | 4/1996 | Awaji | 348/7 |
| 5,526,424 | 6/1996 | Karnowski | 379/355 |
| 5,528,282 | 6/1996 | Voeten et al. | 348/7 |
| B1 4,706,121 | 12/1993 | Young | 358/142 |

*Primary Examiner*—Thomas O. Lee
*Assistant Examiner*—Rehana Perveen
*Attorney, Agent, or Firm*—Lee & Hayes, PLLC

[57] ABSTRACT

The interactive entertainment network system has a headend connected to multiple user interface units in individual homes via a distribution network. The user interface units are operable in a video-on-demand (VOD) mode to order and receive video content programs from the headend. The VOD mode is activated when the viewer tunes to a designated VOD channel. In the event that a viewer orders a video content program, the headend transmits the ordered video content program to the particular user interface unit. The viewer can watch the program at their leisure. In the event that the viewer changes from the VOD channel to a non-VOD channel prior to completion of the ordered program, the headend automatically pauses transmission of the ordered video content program. When the viewer once again tunes to the VOD channel, the headend automatically resumes transmission of the ordered video content program to the user interface unit. In this manner, the viewer is afforded flexibility to watch the ordered program at their own schedule, and is not penalized by missing part of the rented program simply for changing channels.

18 Claims, 7 Drawing Sheets

Fig 2

PAUSE/RESUME REGISTER

| PROGRAM ID | VIEWER ID | PAUSE POINT | RUN FLAG |
|---|---|---|---|
| 501 | 11005 | 01:12:53 | 1 |
| ... | ... | ... | ... |

104

VIEWER TABLE

| ID | NAME | ADDRESS |
|---|---|---|
| 11005 | VIEWER 1 | ADDRESS 1 |
| 11006 | VIEWER 2 | ADDRESS 2 |
| 11007 | VIEWER 3 | ADDRESS 3 |

102

PROGRAM TABLE

| ID | TITLE | MONIKER |
|---|---|---|
| 501 | TITLE 1 | TITLE1.MOD |
| 502 | TITLE 2 | TITLE2.MOD |
| 503 | TITLE 3 | TITLE3.MOD |

SYSTEM FOR AUTOMATIC PAUSE/RESUME OF CONTENT DELIVERED ON A CHANNEL IN RESPONSE TO SWITCHING TO AND FROM THAT CHANNEL AND RESUMING SO THAT A PORTION OF THE CONTENT IS REPEATED

TECHNICAL FIELD

This invention relates to interactive entertainment network systems, such as interactive television (ITV) systems, and to methods for operating such interactive entertainment network systems.

BACKGROUND OF THE INVENTION

Most people are familiar with renting video movies from video rental stores. The customer browses a collection of videos and selects one or two movies for rent. In exchange for the rental price, the customer is permitted to keep the movie for a specified amount of time, such as one or two days. During this rental period, the customer is afforded a high degree of flexibility to watch the movie any time, and as many times, as he/she wishes. The customer can play, pause, rewind, and resume the video movie according to their own personal whims.

In some cable TV systems, subscribers can order a program on designated paying channels. One example commercial system is the Pay-Per-View® system which delivers a selection of programs at preset start times. The cable subscriber orders a particular show by telephone and the ordered program is then delivered over the designated channel to the viewer's own TV set at the preset start time. The Pay-Per-View® system is more convenient than a video rental store in that the viewer can order directly from his/her own home. However, the system offers little flexibility for the viewer who must watch the program at the preset start time. Moreover, the viewer is restricted to watching the movie in its entirety, or else miss a portion of the movie that they paid to see. The program continues to play even if the viewer changes the channel, leaves the room, or otherwise misses part of the movie.

Newer, interactive television (ITV) systems are now bringing a video store to peoples' homes. ITV systems have a single computerized control center, known as the "headend", which interactively communicates with multiple distributed television units located in subscriber homes. The headend provides traditional forms of programming, such as the familiar cable and broadcast programs, as well as newer forms of programming, such as video-on-demand. In the video-on-demand (VOD) mode of operation, a viewer can order video movies directly from his/her own television set. Indeed, in a full interactive entertainment network system like this invention, it is contemplated that a viewer will be able to order "on demand" movies, video games, television shows, and other video content programs from their home.

It would be advantageous for an ITV system to provide movies in a convenient fashion while maximizing viewer flexibility to watch the rented movie according to their personal preference.

SUMMARY OF THE INVENTION

This invention provides an interactive entertainment network system which operates in a video-on-demand mode that allows a viewer to order video content programs (such as movies, games, TV shows, and so forth) and watch them on their own time schedule. The interactive entertainment network system has a headend connected to multiple user interface units in individual homes via a distribution network, such as cable, RF, and/or satellite network. The headend provides full length video content programs to the user interface units, which are commonly referred to as "set-top boxes" in the ITV arena.

The VOD mode is activated when the viewer tunes to a designated VOD channel. In the event that a viewer orders a video content program, the headend transmits the ordered video content program to the particular user interface unit. The viewer can watch the program at their leisure. In the event that the viewer changes from the VOD channel to a non-VOD channel prior to completion of the ordered program, the headend automatically pauses transmission of the ordered video content program. When the viewer once again tunes to the VOD channel, the headend automatically resumes transmission of the ordered video content program to the user interface unit. In this manner, the viewer is afforded the flexibility to watch the ordered program at their own schedule, and is not penalized by missing part of the rented program simply for changing channels.

DETAILED DESCRIPTION OF THE PREFERRED EMBODIMENT

Figure 1:
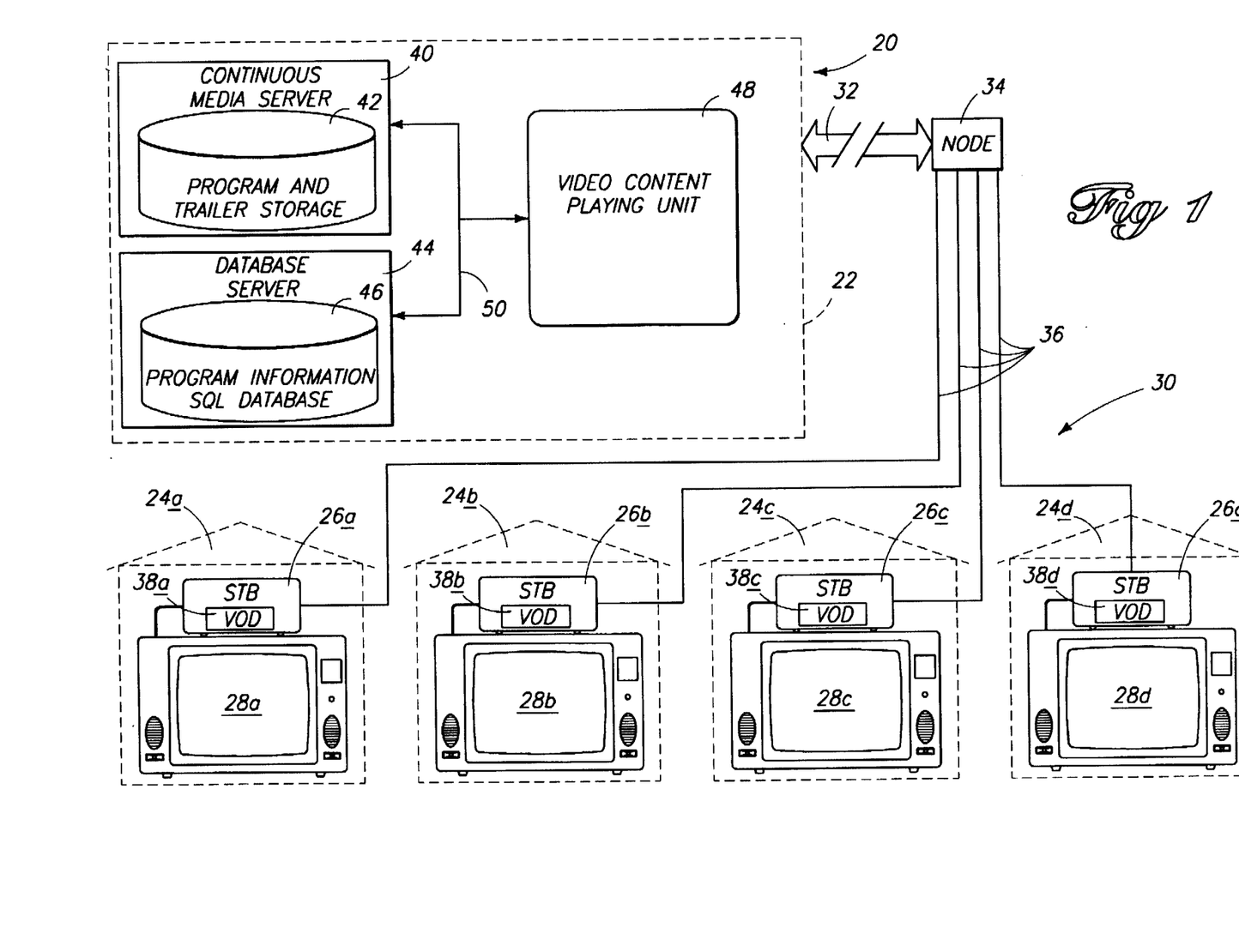
FIG. 1 is a block diagram of a interactive entertainment network system according to one implementation of this invention.

FIG. 1 shows an interactive entertainment network system 20 in the form of an interactive television (ITV) system. System 20 includes a centralized headend or headend server 22 which is configured to provide video content programs to multiple subscriber homes. Representative homes 24a–24d are shown. The video content programs provided by headend 22 might include traditional broadcast TV shows, cable programs, on-demand movies, video games, and other services such as those commonly provided in the past by on-line computer services. A single headend might service 250,000 or more homes.

Each home has a user interface unit 26a–26d, commonly referred to as a set-top box (STB), coupled to a television set (TV) or video display device 28a–28d. The user interface units receive digital video signals from headend 22 and control which programs are displayed on the associated TV sets. Instead of separate STBs, a user interface unit can be incorporated in the TV itself in other implementations.

Headend 22 is interconnected to the subscribers' homes 24a–24d via a multi-tier network or distribution structure 30. In the illustrated embodiment, distribution structure 30 includes a high-speed, high-bandwidth fiber optic cable network 32 coupled to regional distribution nodes (represented by distribution node 34). The speed and bandwidth of the fiber optic cable affords the desired performance for supporting a fully interactive system. Each distribution node 34 is connected to multiple user interface units 26a–26d via conventional home entry lines 36, such as twisted-pair lines or coaxial cable. As an example, each distribution node 34 supports approximately 1200 homes. As technology continues to improve, it is believed that parts of the distribution structure can be replaced with wireless forms of communication, such as RF communication or satellite communication.

Each user interface unit 26a–26d is capable of requesting any one of a plurality of services from the headend. The headend supplies these services on an individual basis to the individual STBs supported by the headend. Perhaps the most basic service consists of traditional broadcast television channels. Other services are more sophisticated.

One sophisticated service is video-on-demand (VOD). As shown in FIG. 1, each user interface unit 26a–26d is configured to run a VOD application 38a–38d. VOD is like having a video store in your own home. Viewers are permitted to browse a wide selection of movies, video games, and TV shows, and rent the program they want to see immediately from their own TV sets.

An electronic programming guide (EPG) is another sophisticated application. The EPG allows a user to scroll through a grid-like menu which correlates program listings and specified start times. In general, each service other than the cable or broadcast television has an associated program or application which runs on the STB. It is desired, however, to keep the STBs as simple as possible. It is not practical for an STB to have non-volatile storage for each different application it might be called upon to run. Thus, executable applications are available from the headend as demanded. When a viewer selects a service requiring an application to be executed on the STB, the application is downloaded and executed.

In a preferred implementation, the various forms of programs are made available on different channels. For instance, there is a designated channel for VOD, a designated channel for EPG, and other designated channels for other applications or for broadcast and cable programming. When the viewer tunes to the VOD channel, the VOD application is downloaded from the headend to the STB and executed to facilitate the viewer's browsing and ordering of video content programs.

Headend 22 provides both full length video content programs and associated previews (which are known as "trailers" in the film industry) to the user interface unit within each home. Headend 22 includes a continuous media server (CMS) 40 with a program and trailer storage 42 to store the programs and previews as digital video data streams in independent data files. Present designs of program and trailer storage 42 are expected to hold hundreds to thousands of full length programs and their trailers.

Unique monikers are assigned to each data file (i.e., each full length program and each trailer). The monikers are used to locate the corresponding data file within the CMS database 42 at the headend. The continuous media server is preferably implemented as a disk array data storage system consisting of many large capacity storage disks, each on the order of one to several Gigabytes. The video data streams are stored digitally on the storage disks in predetermined or mapped locations. The locations of the video data streams are kept in a memory map and each video data stream can be accessed through pointers to the particular memory location.

The continuous media server can service simultaneous requests to view a program "on demand" (and even the same program) from thousands of homes. The digitally stored video data streams can be accessed by any number of viewers at the same or staggered times. For example, one household might request a video data stream of a movie at 8:00 pm, and a second household might request the same video data stream of that movie at 8:02 pm. This situation is easily accommodated by slightly time-staggered pointers to the same video data stream beginning at the same memory location within program and trailer storage 42.

Headend 22 also has a database server 44 to store the programming information about each program and trailer. Database server 44 contains a structured query language (SQL) database 46 with program data records containing information relating to available movies, games, TV shows, or other programs. The SQL records reflect such things as the program title, cast members, director, rating, whether the program has closed captioning or stereo audio, length of program, scheduled time of the program, network name, program category, description text, and so forth. The program information is used by the VOD application and other applications running on the STB (such as the electronic programming guide) to assist the viewer when previewing different programs.

The program data records stored in SQL database 46 contain unique program IDs that are assigned to each full length video content program and unique trailer IDs that are assigned to each video trailer. The program and trailer IDs are employed as a shorthand identification tag for rapid search of SQL database 46 and for establishing relational ties between a program and its associated trailer. The program data records further contain the monikers to locate the programs and trailers within CMS storage 42. These monikers are short name descriptors that represent or call to pointers to storage locations within storage 42 of continuous media server 40. The pointers identify storage locations of the video data streams of the programs and trailers that correspond to the information listed in the SQL database.

A video content playing unit 48 is also provided at headend 22. Video content playing unit 48 is connected to both the CMS database and the SQL database via headend bus 50. Video content playing unit 48 locates and retrieves a desired video content program from the CMS database in response to a request from an STB which is operating in the VOD mode. The playing unit further controls the digital transmission of the video content program over the distribution structure 30 on the VOD channel to the requesting STB.

Figure 2:
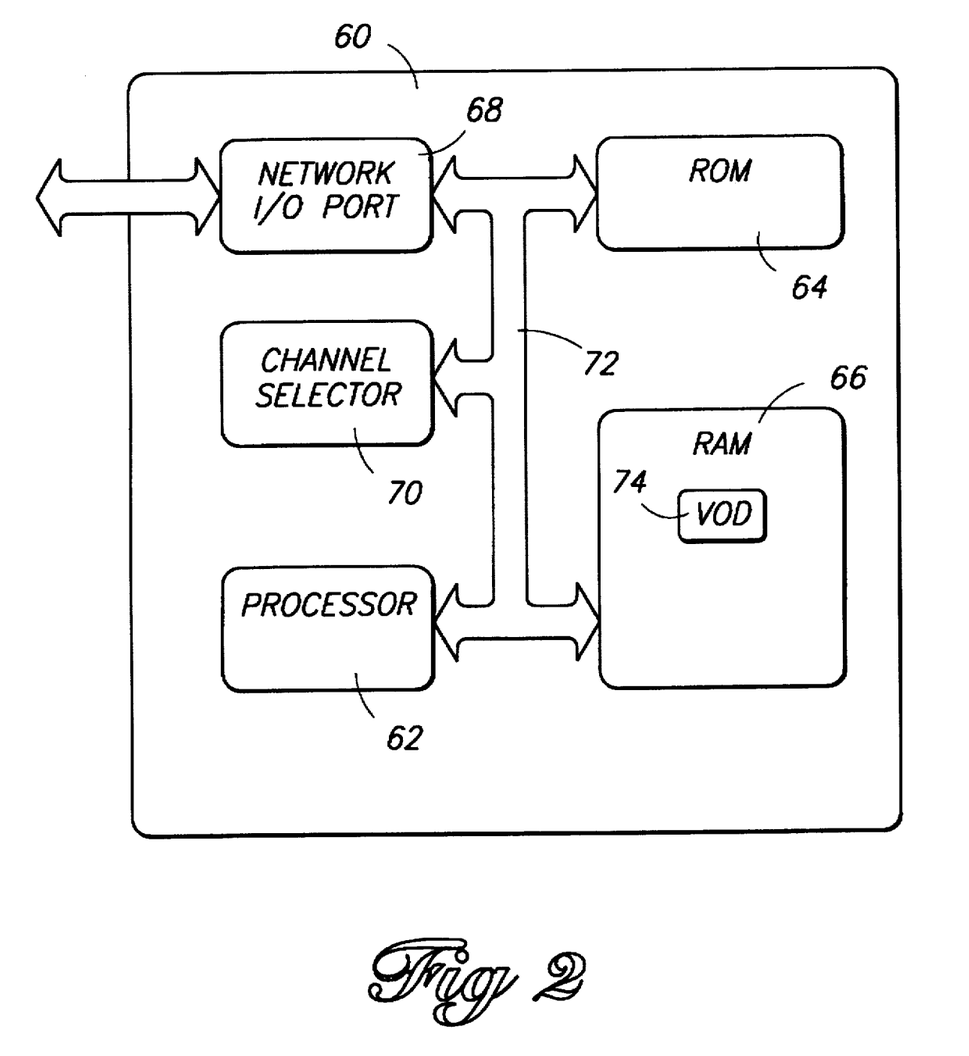
FIG. 2 is a block diagram of a user interface unit according to one implementation of this invention.

FIG. 2 shows a user interface unit or set-top box 60 according to an example implementation. STB 60 includes a programmable data processor 62, non-volatile memory (ROM) 64, volatile data/program memory (RAM) 66, network I/O port 68, and a channel selector 70. These components are interconnected via an internal multi-bit conductor or bus 72. Network I/O port 68 is responsive to data processor 62 for communicating with the headend to request and receive the program data records from SQL database 46. The network I/O also receives the digital video data streams of the programs that are transmitted by video content playing unit 48. Network I/O port 68 is preferably a bi-directional transceiver incorporating analog-to-digital and digital-to-analog conversion circuitry.

A video-on-demand (VOD) application 74 runs on STB data processor 62 from data/program memory 66. VOD application 74 is an executable program which is downloaded as an object or module from the headend when channel selector 70 tunes to the VOD channel. The VOD application has a preview browse user interface (UI) which assists the viewer in navigating through portions of the video-on-demand application. The preview browse UI helps the viewer define a set of criteria used to group programs of interest, and then facilitates the display of preview video trailers on the TV which correspond to these programs. The UI further enables the viewer to "surf" through the various trailers at his/her own pace, and rent a program for immediate viewing.

Figure 3:
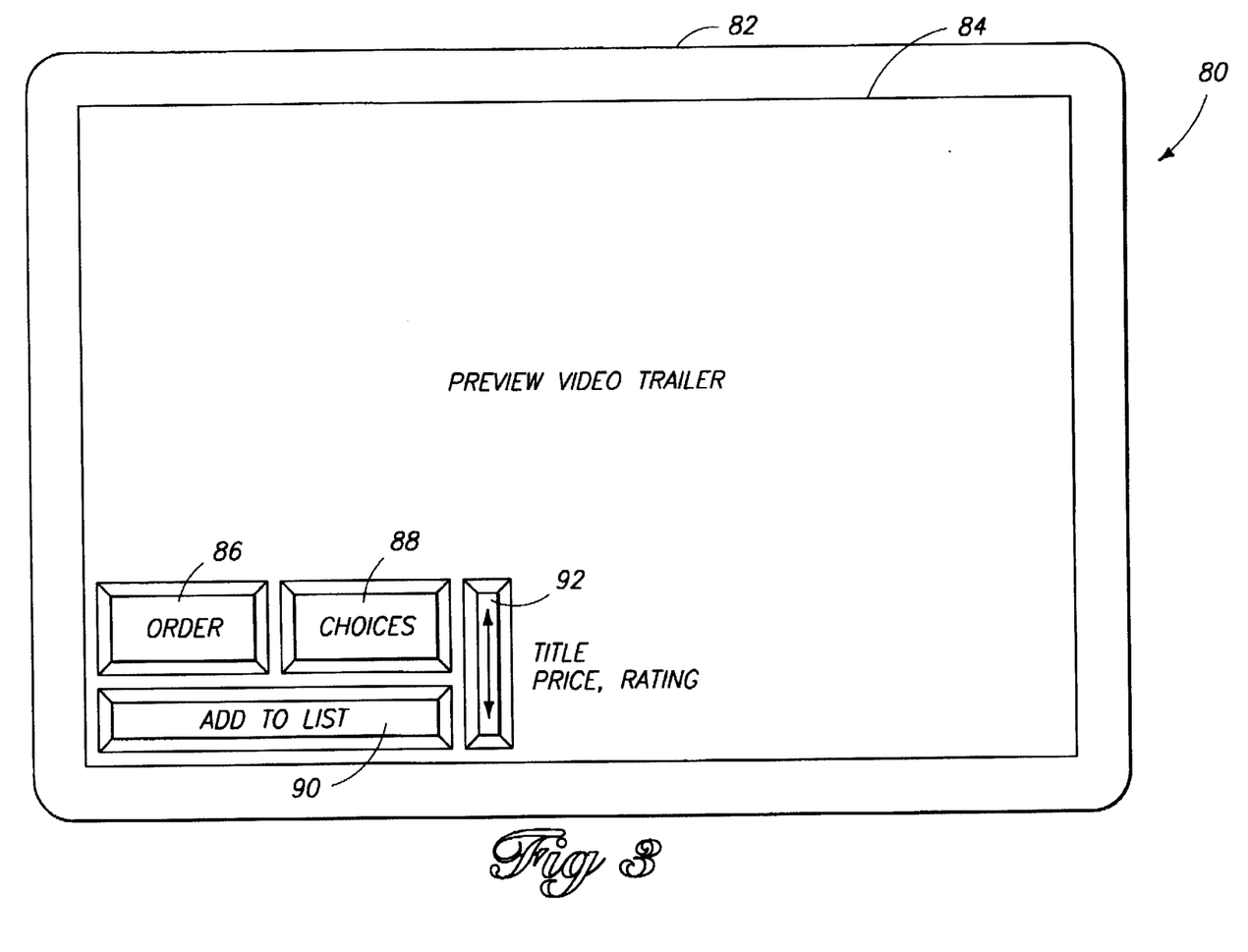
FIG. 3 is an exemplary screen illustration of a video-on-demand application.

FIG. 3 shows an initial screen display 80 of the preview browse UI of VOD application 74. In this graphic illustration, outer rectangle 82 represents the television screen. An inner rectangular area 84 represents the standardized NTSC video safe zone, which is the area of a TV screen that is presumed to be viewable on any set. Previews are initially displayed within area 82 upon tuning to the VOD channel.

The preview browse UI has multiple actuatable graphical icons overlaid on the video trailers. In initial screen display 80, four icon buttons are present at the lower-left corner: an "order" button 86, a "choices" button 88, an "add to list" button 90, and an integrated "up/down" button 92. The buttons are 75 percent transparent and placed directly over the video trailer. The graphical icon buttons are arranged within video safe area 84.

The "order" button 86 enables the user to order a video content program that corresponds to the displayed analog preview video trailer, without reverting to a blank order menu or the like. Suppose the viewer wishes to rent the program that is presently being previewed. The viewer simply actuates the overlaid "order" button 86 which causes the STB to send a message to the headend. This message contains some descriptor of the trailer (such as its ID or moniker) or some descriptor of the program (such as its ID or moniker) that corresponds to the trailer being depicted. Such descriptors are initially supplied to the STB as part of an information packet obtained from the SQL database when the VOD application is initiated. The descriptor is used by the CMS database to retrieve the full length video content program. The headend then transmits the full length video content program as a digital video data stream over the distribution network to the STB that ordered the program.

The "choices" button 88 enables the viewer to choose different criteria for grouping programs into manageable sets for a more selective review. For instance, the criteria might be by star name, category type (e.g. new releases, westerns, oldies, foreign films), or kind (i.e., video games, movies, TV shows). The "add to list" button 90 permits the viewer to create a customized list of personal favorites that he/she might wish to watch some day. The "up/down" button 92 enables the viewer to skip through the preview video trailers, forwards and backwards, in the same manner that the viewer is accustomed to channel surfing through traditional cable channels. This allows the viewer to control the pace at which he/she watches the previews, skipping over uninteresting ones or replaying previews of interest.

A focus frame, or the like, can be used to highlight the operable button. To enhance intuitive visual feedback to the viewer, the program browse UI provides a graphical change to indicate when an icon button is depressed. This provides a visual and auditory feedback which the user associates with the manual actuation and tactile sensation of depressing a physical control button on the STB or remote control handset. This feedback is helpful in the interactive environment because the viewer might experience a slight delay, albeit very short, between the time he/she depresses the physical control button and the time the appropriate response to the control is depicted on the TV. By graphically changing the icon, the viewer is visually informed that his/her command has been received and is in the process of being completed.

A space adjacent to the icon buttons is reserved for displaying textual information pertaining to the program preview that is being shown. This information includes the title, rental price, and rating, although any other program related information can also be displayed (e.g., cast names, close caption, brief description, director, etc.).

For purposes of continuing discussion, suppose the viewer rents a particular program by actuating the "order" button and begins watching it. However, prior to completion of the program, the viewer changes to a different non-VOD channel. Example non-VOD channels include channels associated with traditional broadcast or cable programs and channels associated with other applications, such as EPG.

When the viewer switches from playing a program on the VOD channel to a non-VOD channel, the interactive entertainment network system automatically pauses the playing program. Since the viewer is no longer viewing the video content program that they ordered and paid for, it is desirable to pause transmission rather than continue playing a rented program that the customer is no longer watching. This affords the viewer the flexibility to view other channels, for whatever reason, without being penalized by missing a portion of a program that they rented.

Figure 4:
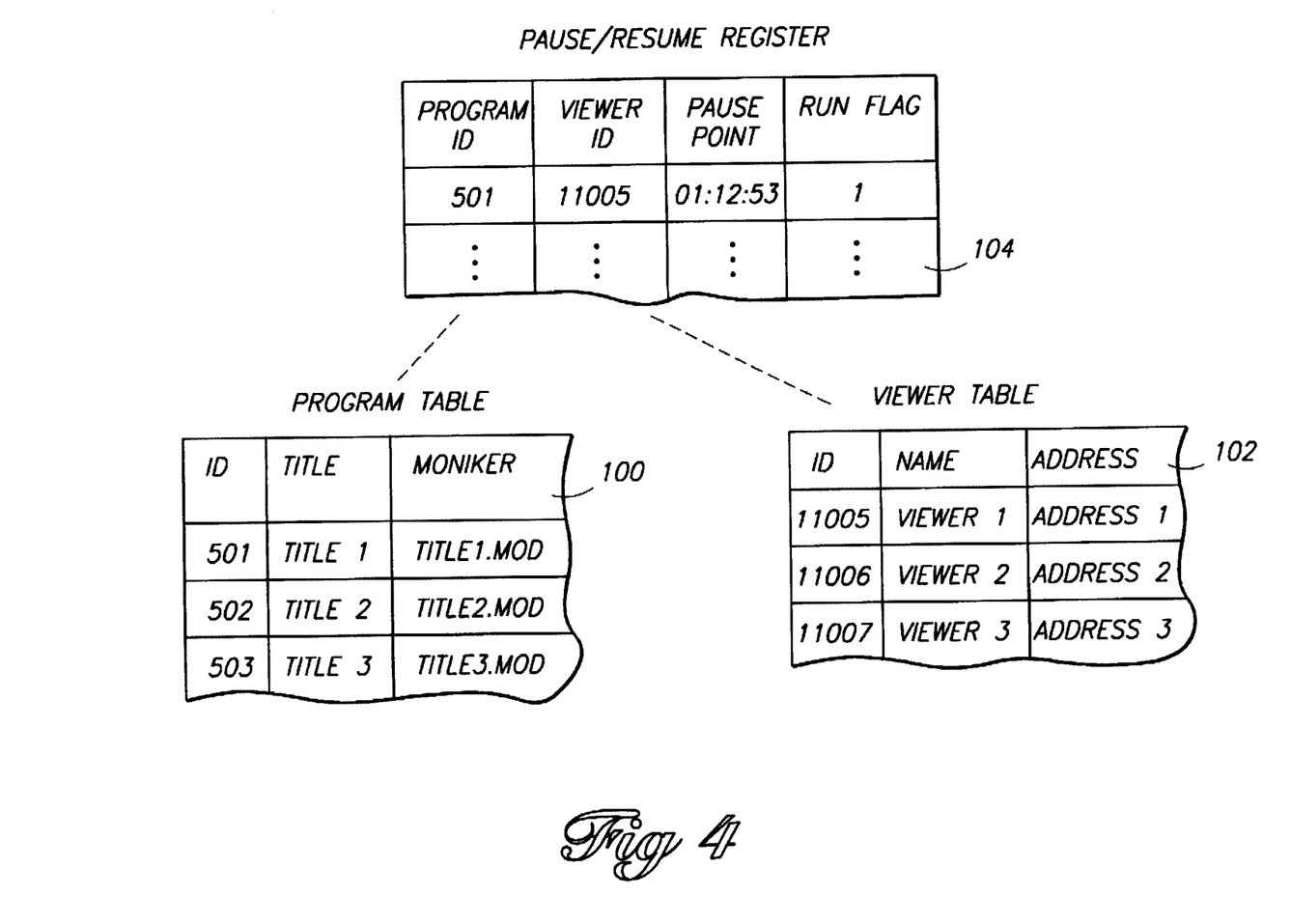
FIG. 4 is a simplified example of database records.

Upon switching to a non-VOD channel, the STB transmits to the headend a pause message containing a viewer ID. With reference to FIG. 4, the SQL database at the headend maintains a viewer table 100 with information pertaining to each subscriber, including their name, address, and ID. The viewer ID contained in the pause message is used by the SQL database to identify the particular STB that has changed from the VOD channel. The SQL database also maintains a program table 102 which has a list of available programs and information pertaining to the programs. Such information includes the program ID, title, program moniker, preview ID, preview moniker, cast members, and so forth.

The pause message instructs the headend video content playing unit 48 to cease transmission of the present program to the STB associated with the viewer ID. Preferably, the video content playing unit 48 notes the elapse time of the program to mark the juncture of the program when paused. As an alternative to elapse time, the playing unit can identify the time remaining or some other temporal reference to the pause point in the unfinished program. Another way to identify the pause point is to have the video content playing unit create a pointer to the memory location within the CMS database which corresponds to the juncture of the program when paused. The video content playing unit thus returns a program ID and a pause point to the unfinished program (i.e., a temporal reference, such as elapsed time, or a memory pointer). The program ID and pause point are used later to resume play when the viewer switches back to the VOD channel.

As shown in FIG. 4, the SQL database maintains a pause/resume register 104 which contains the program ID of the paused program, the viewer ID of the STB that sent the pause message, and the pause point at which the program is stopped. Here, the pause point is represented by an elapsed time reference of one hour, twelve minutes, and 53 seconds. This pause point identifies how much of the program has run, and the spot at which the program should be queued when play resumes. If the pause point is a memory pointer, the entry in register 104 would be an address to a memory location corresponding to the place in the video program when paused.

Optionally, a run flag field can be included to quickly reference whether a program was paused mid-delivery (i.e., designated by a set "1" condition) or whether no program was playing when the STB exited the VOD channel (i.e., designated by a reset "0" condition). The pause/resume register therefore tracks individual viewers regarding their VOD activity, including whether they have switched channels during mid-delivery of a program.

When the viewer once again tunes to the VOD channel, the headend sends a resume message to the headend. The resume message contains the viewer ID. The headend queries the SQL database, and particularly the pause/resume register 104, to determine whether the corresponding viewer had previously been watching a program that had not completed. The pause/resume register returns the program ID and pause point which are used to access and retrieve the remaining portion of the unfinished video content program from the CMS database. The headend then resumes transmission of the program to the STB.

Figure 5:
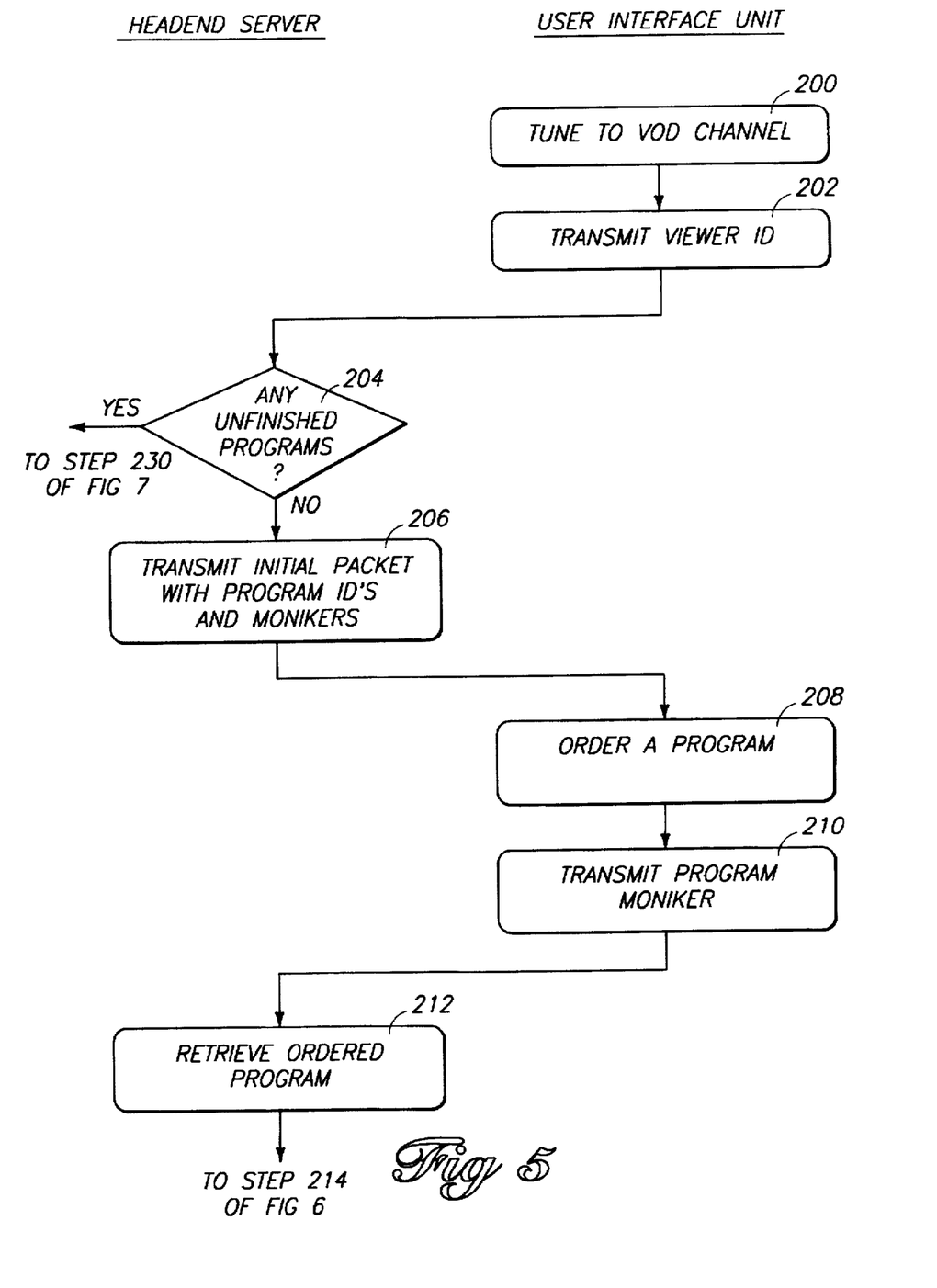
FIGS. 5-7 present a flow diagram of steps for operating an interactive entertainment network system in a video-on-demand mode according to an aspect of this invention.
Figure 6:
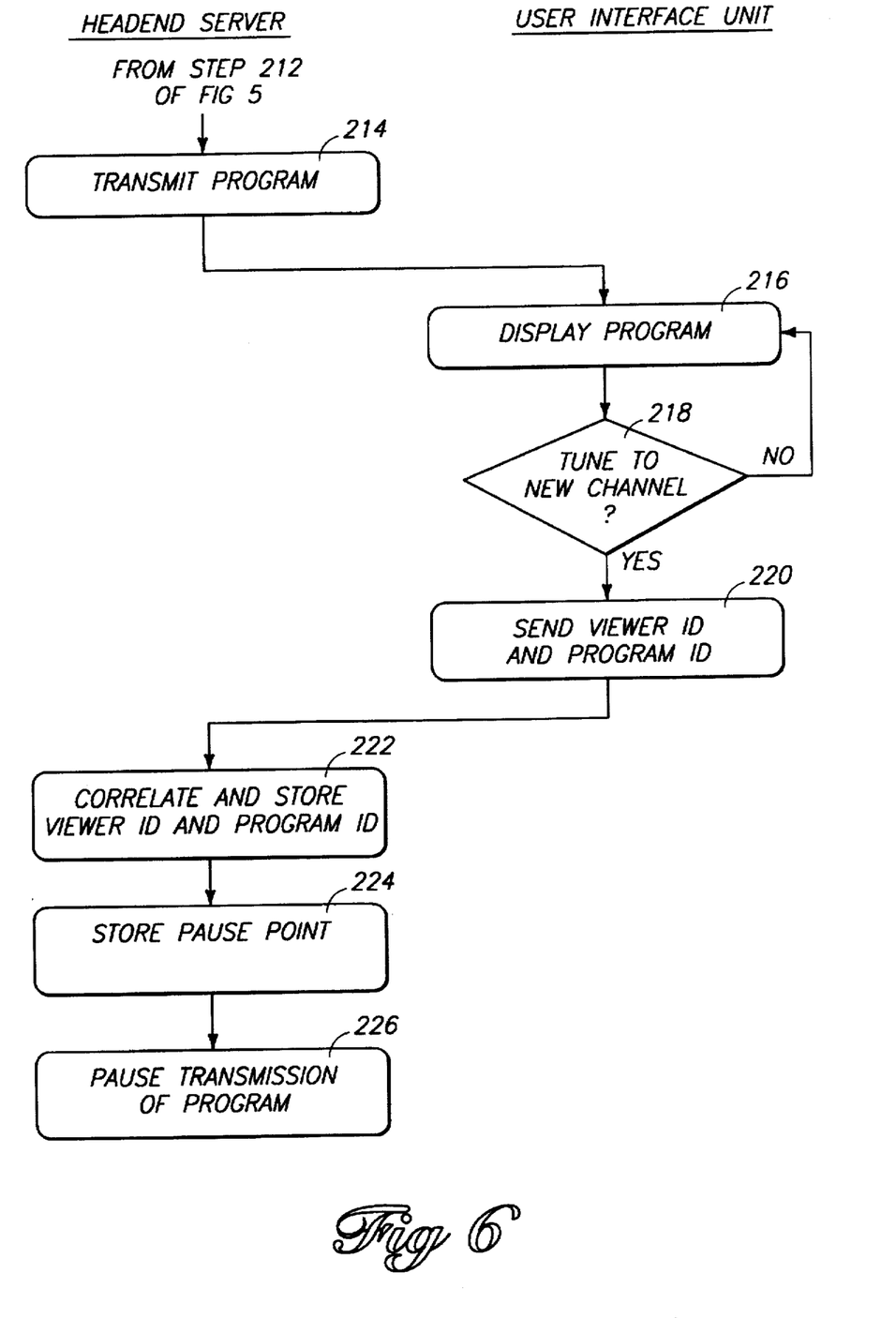
Figure 7:
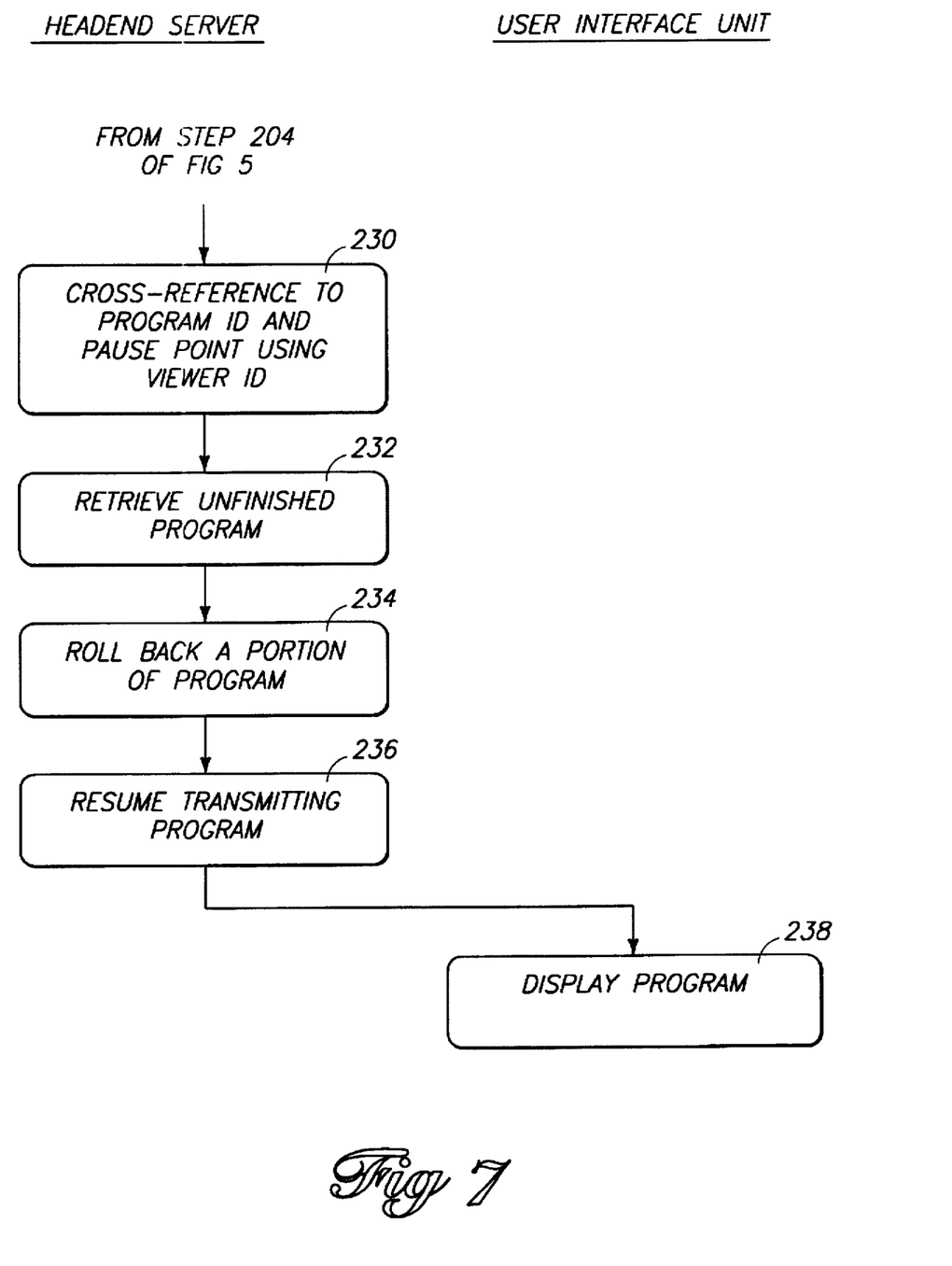

FIGS. 5-7 show steps in a method for operating an interactive entertainment network system in a video-on-demand mode of operation. Beginning at step 200 in FIG. 5, the viewer initially tunes to the VOD channel using a remote control handset or front panel controls of the STB. The STB transmits a viewer ID to the headend (step 202). Upon receiving the viewer ID, the headend examines the pause/resume register 104 (FIG. 4) to determine whether this STB has any unfinished programs that need completion. Assuming that no unfinished program exist (i.e., the "no" branch from step 204), the headend transmits an initial information packet with various program IDs, monikers, trailer IDs, and the like to initialize the VOD application and the preview browse UI (step 206).

Suppose that after browsing through many different video options, the viewer decides to order a particular program (step 208). At step 210, the STB sends the program moniker of that program to the headend. The program moniker is used by the CMS database to access and retrieve the ordered program (step 212) which is then transmitted back down to the requesting STB (step 214 in FIG. 6). At step 216, the program is displayed on the viewer's TV set.

At decision step 218 (FIG. 6), a navigator application running on the STB monitors whether the viewer has selected a different channel. If the viewer has not tuned to a non-VOD channel (i.e., the "no" branch from step 218), play of the ordered program continues. On the other hand, when the viewer tunes to a new channel (i.e., the "yes" branch from step 218), the STB sends a viewer ID and program ID to the headend (step 220). These IDs are stored in the pause/resume register within the SQL database in a correlated fashion (step 222). The video content playing unit stores a pause point in the pause/resume register (step 224) and pauses transmission of the program mid-stream (step 226).

Now suppose that the viewer returns to the VOD channel. This is essentially step 200 in FIG. 5. The set-top box once again transmits the viewer ID to the headend (step 202) where it is evaluated whether there is an unfinished program for that STB (step 204). In our example, there is an unfinished program and flow continues in FIG. 7 (i.e., the "yes" branch from step 204).

At step 230 in FIG. 7, the viewer ID is cross-referenced in the pause/resume register to retrieve the program ID and pause point. The video content playing unit employs the viewer ID and pause point to access the CMS database and retrieve the unfinished program (step 232). At step 234, the program can be optionally rolled back so that a portion of the program is repeated to refresh the viewer with the sequence of events where the viewer last left off. In this manner, the video content playing unit addresses the CMS database at a resume point that is earlier in the video content program than the pause point referenced by the pointer. This can be accomplished by indexing the pointer to an different memory location corresponding to the earlier spot in the program. At step 236, the video content playing unit resumes transmission of the unfinished program which is displayed on the viewer's STB (step 238).

The pause/resume feature is automatic and requires no activity on the part of the viewer. The auto-pause aspect is simply invoked when the viewer switches from the VOD channel prematurely before completion of an ordered program, and the auto-resume aspect is conducted when the viewer returns to the VOD channel.

There are two contemplated ways for handling the VOD application when the viewer changes to a new channel. One technique is to simply leave the VOD application running and active in the STB RAM. This would be the case, for example, where the viewer merely switches to a cable or broadcast channel that does not require a separate application. Conversely, if the viewer changes to another channel that is associated with a different application, such as the EPG, that application must be downloaded to the STB. The set-top box RAM may not be of sufficient size to support both the EPG application and the VOD application. In this case, the second technique is to purge the VOD application from the RAM and load the EPG application. In the event that the viewer returns to the VOD channel, the VOD application will once again be loaded from the headend to replace the EPG application. By loading the active application each time, the STB RAM can be minimized in size, thereby reducing the cost of the overall interactive entertainment network system.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

We claim:

1. In an interactive system in which a content provider serves video content programs to one or more user interface units over multiple channels on a distribution network, a system comprising:

a channel selector resident at a user interface unit to choose between (1) a video-on-demand (VOD) channel which permits a viewer to request and receive a particular video content program and (2) one or more non-VOD channels;

in the event that the channel selector selects the VOD channel to request a video content program, the content provider transmitting the ordered video content program to the user interface unit;

in the event that the channel selector changes from the VOD channel to a non-VOD channel, the content provider pausing transmission of the ordered video content program to the particular user interface unit in response to the channel change;

in the event that the channel selector changes from the non-VOD channel back to the VOD channel, the content provider resumes transmission of the ordered video content program to the particular interface unit; and the content provider pauses transmission of the ordered video content program at a pause point and later resumes transmission of the ordered video content program at a resume point that is earlier in the video content program than the pause point so that a portion of the video content program is repeated.

2. A system as recited in claim 1 wherein:

each video content program has a unique program ID;

each viewer has a unique viewer ID; and the content provider stores the program ID and viewer ID in an associated relationship when the ordered video content program is paused.

3. A system as recited in claim 2 wherein:

the content provider identifies a juncture of the ordered video content program that is playing when the video content program is paused.

4. In an interactive system in which a content provider serves video content programs to one or more user interface units over multiple channels on a distribution network, a system comprising:

a continuous media server database at the content provider to store the video content programs;

a program information database at the content provider to maintain program data records, the program data records containing program IDs of the video content programs stored within the continuous media server database;

a content playing unit at the content provider coupled to the continuous media server and the program information database;

a video-on-demand (VOD) application which executes on a user interface unit to enable a viewer to order a video content program from the content provider whereby when ordered, the content playing unit retrieves the ordered video content program from the continuous media server database and transmits the ordered video content program to the user interface unit on a VOD channel;

in the event the viewer selects a non-VOD channel prior to completion of the ordered video content program, the user interface unit automatically sending a pause message to the content provider, the pause message containing a viewer ID associated with the user interface unit and a program ID of the ordered video content program;

the content playing unit, in response to the pause message, stopping transmission of the ordered video content program at a pause point;

the content playing unit storing the viewer ID, the program ID, and the pause point in a correlated relationship within the program information database;

in the event the viewer tunes again to the VOD channel, the user interface unit automatically sends a resume message to the content playing unit, the resume message containing the viewer ID;

the content playing unit, responsive to the resume message, retrieves from the program information database the program ID and the pointer that are correlated with the viewer ID in the resume message, the content playing unit using the program ID and the pointer to access the continuous media server database and retrieve the video content program that has been paused;

the content playing unit resumes transmission of the video content program to the user interface unit that is associated with the viewer ID; and the content playing unit resumes transmission of the video content program at a memory location prior to the memory location referenced by the pointer so that a portion of the video content program is repeated.

5. A system as recited in claim 4 wherein:

the pause point is a temporal reference marking a juncture at which the video content program is paused.

6. A system as recited in claim 4 wherein:

the pause point is a memory pointer to a memory location within the continuous media server database which corresponds to a juncture at which the video content program is paused.

7. A system as recited in claim 4 wherein:

the VOD application remains active at the user interface unit when the viewer changes from the VOD channel to the non-VOD channel.

8. A system as recited in claim 4 further comprising:

a memory at the user interface unit;

at least one application other than the VOD application which is executable on the user interface unit; and the memory having limited capacity to support one of the applications so that when the viewer changes from the VOD channel to the non-VOD channel, the VOD application ceases to execute on the user interface unit and said other application is initiated to execute on the user interface unit.

9. In an interactive system in which a content provider serves streaming content to a user interface unit over multiple channels on a distribution network, a system comprising:

a channel selector at a user interface unit to choose between a first channel and a second channel;

a playing unit at the content provider configured to transmit, upon selection of the first channel by the channel selector, a video content program to the user interface unit;

the playing unit being configured to pause, in response to the channel selector changing from the first channel to the second channel, transmission of the video content program on the first channel to the user interface unit;

in the event that the channel selector changes from the second channel back to the first channel, the playing unit resumes transmission of the video content program to the user interface unit; and the playing unit resumes transmission of the video content program at a resume point that is earlier in the video content program than a pause point so that a portion of the video content program is repeated.

10. A content provider for an interactive entertainment network system, the content provider providing video content programs to one or more user interface units over a distribution network that facilitates a plurality of channels, the content provider comprising:

a continuous media server database to store the video content programs;

a program information database to store program data records pertaining to the video content programs;

a video content playing unit connected to the continuous media server database and the program information database, the video content playing unit transmitting a selected video content program on a video-on-demand (VOD) channel to a particular user interface unit;

in response to a message indicating that the particular user interface unit is no longer tuned to the VOD channel, the video content playing unit pausing transmission of the selected video content program;

in response to a message indicating that the particular user interface unit is once again tuned to the VOD channel, the video content playing unit resumes transmission of the selected video content program;

the video content programs are stored in the continuous media server database as digital data files;

the video content playing unit generates a memory pointer to a memory location within the continuous media server database which corresponds to a juncture at which the video content program is paused; and in response to a message indicating that the particular user interface unit is tuned to the VOD channel, the video content playing unit uses the memory pointer to locate the video content program and resumes transmission of the video content program from a memory location prior to the memory location indexed by the memory pointer.

11. A content provider as recited in claim 10 wherein:

the video content playing unit temporarily stores a viewer ID associated with the particular user interface unit and a program ID of the paused video content program in the program information database when transmission is paused; and the video content playing unit recalls the program ID to identify the paused video content program and the viewer ID to identify the particular user interface unit in the event transmission resumes.

12. A content provider as recited in claim 10 wherein:

the video content playing unit generates a temporal reference marking a juncture at which the video content program is paused.

13. A method for operating an interactive entertainment network system having a content provider which provides streaming content on multiple channels to a user interface unit, the method comprising the following steps:

tuning the user interface unit to a first channel;

transmitting a streaming content on the first channel from the content provider to the user interface unit;

tuning the user interface unit to a second channel;

automatically pausing transmission of the content on the first channel in response to said step of tuning to the second channel;

tuning the user interface unit once again to the first channel;

automatically resuming transmission of the content on the first channel; and repeating a portion of the streaming content upon resuming transmission.

14. A method for operating an interactive entertainment network system in a video-on-demand (VOD) mode, the interactive entertainment network system having a content provider which provides video content programs on multiple channels to a user interface unit, the method comprising the following steps:

tuning the user interface unit to a VOD channel;

sending a request for a video content program from the user interface unit to the content provider;

retrieving the requested video content program at the content provider;

transmitting the video content program on the VOD channel to the user interface unit;

tuning the user interface unit to a non-VOD channel;

automatically sending a pause message from the user interface unit to the content provider when the user interface unit is tuned to the non-VOD channel, the pause message containing a viewer ID and a program ID;

storing the viewer ID and the program ID at the content provide;

associating the viewer ID and the program ID at the content provider;

pausing transmission of the video content program on the VOD channel;

tuning the user interface unit once again to the VOD channel;

automatically sending a resume message from the user interface unit to the content provider when the user interface unit is tuned to the VOD channel, the resume message containing the viewer ID;

referencing the associated program ID using the viewer ID received in the message;

retrieving the video content program using the program ID;

resuming transmission of the video content program on the VOD channel to the user interface unit;

storing a pointer which corresponds to a juncture of the video content program that is playing when the video content program is paused; and resuming transmission of the video content program before the juncture referenced by the pointer.

15. A method as recited in claim 14 further comprising the following additional step:

storing a temporal reference which corresponds to a juncture of the video content program that is playing when the video content program is paused.

16. In an interactive system in which a content provider serves content to a user interface unit over multiple channels on a network, a computer-readable medium resident at the content provider having computer-executable instructions for performing steps comprising:

receiving a request to serve streaming content over a first channel to the user interface unit;

transmitting the content on the first channel to the user interface unit;

receiving a message from the user interface unit indicating that the user interface unit has switched to a second channel;

pausing transmission of the content on the first channel;

receiving a message from the user interface unit indicating that the user interface unit has switched to the first channel;

automatically resuming transmission of the content on the first channel; and repeating a portion of the streaming content upon resuming transmission.

17. In an interactive system in which a content provider serves content to a user interface unit over multiple channels on a network, a computer-readable medium resident at the user interface unit having computer-executable instructions for performing steps comprising:

tuning the user interface unit to a first channel;

sending a request to the content provider to serve streaming content over the first channel;

receiving the content on the first channel;

tuning the user interface unit to a second channel;

automatically sending a pause message to the content provider when the user interface unit is tuned to the second channel;

subsequently tuning the user interface unit once again to the first channel;

automatically sending a resume message to the content provider when the user interface unit is tuned to the first channel; and repeating a portion of the streaming content upon resuming transmission.

18. In an interactive system in which a content provider serves content to a user interface unit over multiple channels on a network, a computer-readable media distributed at the content provider and user interface unit having computer-executable instructions for performing steps comprising:

tuning the user interface unit to a first channel;

sending a request to the content provider to serve streaming content over the first channel;

retrieving the requested content at the content provider;

transmitting the content on the first channel to the user interface unit;

tuning the user interface unit to a second channel;

automatically sending a pause message from the user interface unit to the content provider when the user interface unit is tuned to the second channel, the pause message containing a viewer ID and a content ID;

storing the viewer ID and the content ID at the content provider;

associating the viewer ID and the content ID at the content provider;

pausing transmission of the content on the first channel;

subsequently tuning the user interface unit once again to the first channel;

automatically sending a resume message from the user interface unit to the content provider when the user interface unit is tuned to the first channel, the resume message containing the viewer ID;

referencing the associated content ID using the viewer ID received in the message;

retrieving the content using the content ID; and resuming transmission of the content on the first channel to the user interface unit;

repeating a portion of the streaming content upon resuming transmission.

* * * * *